United States Patent
Wöhrle et al.

(10) Patent No.: US 9,748,528 B2
(45) Date of Patent: Aug. 29, 2017

(54) HARD SHELL CELL HOUSING WITH VAPOUR BARRIER LAYER

(71) Applicants: Robert Bosch GmbH, Stuttgart (DE); Samsung SDI Co., Ltd., Yongin-si, Gyeonggi-do (KR)

(72) Inventors: Thomas Wöhrle, München (DE); Joachim Fetzer, Bad-Ditzenbach (DE); Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 205 days.

(21) Appl. No.: 14/364,799

(22) PCT Filed: Nov. 15, 2012

(86) PCT No.: PCT/EP2012/072745
§ 371 (c)(1),
(2) Date: Jun. 12, 2014

(87) PCT Pub. No.: WO2013/087349
PCT Pub. Date: Jun. 20, 2013

(65) Prior Publication Data
US 2014/0335401 A1    Nov. 13, 2014

(30) Foreign Application Priority Data

Dec. 15, 2011  (DE) .......... 10 2011 088 698
Apr. 13, 2012  (DE) .......... 10 2012 206 075

(51) Int. Cl.
*H01M 2/02* (2006.01)
*H01M 2/04* (2006.01)
(Continued)

(52) U.S. Cl.
CPC .......... *H01M 2/029* (2013.01); *H01M 2/028* (2013.01); *H01M 2/0262* (2013.01);
(Continued)

(58) Field of Classification Search
None
See application file for complete search history.

(56) References Cited

U.S. PATENT DOCUMENTS

| | | | |
|---|---|---|---|
| 2004/0137321 A1* | 7/2004 | Savaria | H01M 2/1016 429/176 |
| 2006/0029808 A1* | 2/2006 | Zhai | B05D 5/04 428/412 |
| 2007/0207379 A1* | 9/2007 | Hatta | H01M 2/0207 429/176 |

FOREIGN PATENT DOCUMENTS

| DE | 601 33 575 T2 | 5/2009 |
|---|---|---|
| JP | 2000-251852 A | 9/2000 |

(Continued)

OTHER PUBLICATIONS

International Search Report corresponding to PCT Application No. PCT/EP2012/072745, mailed Jan. 21, 2013 (German and English language document) (5 pages).

*Primary Examiner* — Daniel Gatewood
(74) *Attorney, Agent, or Firm* — Maginot, Moore & Beck LLP

(57) ABSTRACT

A hard shell cell housing for an individual alkali metal cell includes a housing main body with an interior space that is configured to accommodate cell components of the individual alkali metal cell, and a housing cover configured to close off the interior space. The housing main body is formed at least substantially from plastic, and further includes at least one vapor barrier layer.

15 Claims, 6 Drawing Sheets

(51) Int. Cl.
  *H01M 2/08*      (2006.01)
  *H01M 2/10*      (2006.01)
  *H01M 10/0525*   (2010.01)
  *H01M 10/0587*   (2010.01)

(52) U.S. Cl.
  CPC ....... *H01M 2/0267* (2013.01); *H01M 2/0275* (2013.01); *H01M 2/0292* (2013.01); *H01M 2/0482* (2013.01); *H01M 2/0491* (2013.01); *H01M 2/08* (2013.01); *H01M 2/1072* (2013.01); *H01M 2/1094* (2013.01); *H01M 10/0525* (2013.01); *H01M 10/0587* (2013.01); *Y02E 60/122* (2013.01); *Y02P 70/54* (2015.11); *Y02T 10/7011* (2013.01); *Y10T 29/4911* (2015.01)

(56) References Cited

FOREIGN PATENT DOCUMENTS

| | | |
|---|---|---|
| JP | 2000-251858 A | 9/2000 |
| JP | 2000-256492 A | 9/2000 |
| JP | 2004-281156 A | 10/2004 |
| JP | 2006-508503 A | 3/2006 |
| JP | 2008-98092 A | 4/2008 |
| JP | 2008-520067 A | 6/2008 |
| JP | 2011-54567 A | 3/2011 |
| WO | 2011/020581 A1 | 2/2011 |

* cited by examiner

HARD SHELL CELL HOUSING WITH VAPOUR BARRIER LAYER

This application is a 35 U.S.C. §371 National Stage Application of PCT/EP2012/072745, filed on Nov. 15, 2012, which claims the benefit of priority to Serial Nos. DE 10 2011 088 698.2 filed on Dec. 15, 2011 in Germany, and DE 10 2012 206 075.8, filed on Apr. 13, 2012 in Germany, the disclosures of which are incorporated herein by reference in their entirety.

The present disclosure relates to a hard shell cell housing for an individual galvanic cell, to such a galvanic cell, to methods for the production thereof and also to a vehicle equipped with such a galvanic cell.

BACKGROUND

It is becoming apparent that, in the future, battery systems will increasingly be used for stationary applications, for example solar and wind power plants, for mobile applications, for example vehicles, such as hybrid and electric vehicles, and in the consumer sector, for example laptops and cell phones, these systems having to meet very high requirements with respect to safety, reliability, power and lifetime.

An important parameter for the power is the energy density, which is given for example in watt-hours per kilogram (Wh/kg). The capacity of a galvanic cell is determined by what is known as the active or electrochemically active materials. Apart from these materials, galvanic cells also have what are known as passive materials, such as separators, insulators, electrode binders and housing or package elements, the weight of which, like the weight of the active materials, has an influence on the energy density.

Predestined for a wide area of use are, in particular, lithium-ion cells, since they are distinguished inter alia by high energy densities of the active materials and an extremely low self-discharge. Lithium-ion cells have a positive electrode (cathode) and negative electrode (anode). The active material of the negative electrode (anode) of a lithium-ion cell is designed here for the reversible insertion (intercalation) of lithium ions ($Li^+$) or extraction (deintercalation) again of lithium ions ($Li^+$), and is therefore also referred to as intercalation material. Conventionally, graphite is used on the anode side as intercalation material.

Another attractive battery system is that of rechargeable metallic lithium systems, which likewise have a positive electrode (cathode) and negative electrode (anode), in which however the active material of the negative electrode (anode) is not lithium-intercalating material, but metallic lithium or a lithium alloy.

In order to achieve great mechanical stability and meet high safety requirements, for example in the case of vehicles, lithium-ion cells and lithium cells with a metallic lithium anode for such applications are conventionally protected from environmental influences, in particular from any entry of moisture into the interior of the cell, by purely metallic hard shell cell housings, known as hard case housings. At present, such hard shell cell housings are usually produced from aluminum by cold deep-drawing methods. Apart from mechanical protection, metallic hard shell cell housings also protect the components of the cell(s) housed therein from moisture, since the metallic housing material also serves as a moisture or vapor barrier.

SUMMARY

The subject matter of the present disclosure is a hard shell cell housing for an individual alkali metal cell, in particular lithium cell, which comprises a housing main body with an interior space for accommodating the cell components of an individual alkali metal cell, in particular lithium cell, and a housing cover for closing off the interior space of the housing main body, wherein the housing main body is formed at least substantially from plastic and comprises at least one vapor barrier layer.

An alkali metal cell may be understood in particular as meaning a galvanic cell which comprises an alkali metal, such as lithium or sodium, as the electrochemically active material, for example anode material.

The cell components of an alkali metal cell may be understood in particular as meaning the electrochemically active components of an alkali metal cell, such as the anode, the cathode, the electrolyte and/or the conductive salt, and also electrical components, such as electrical outgoing conductors, electrical insulators and/or separators within the alkali metal cell.

A vapor barrier layer may be understood in particular as meaning a layer of a material that has a high water vapor diffusion resistance. Preferably, the material of the vapor barrier layer has a higher water vapor diffusion resistance than the plastic from which the housing main body or the housing cover is formed. The water vapor diffusion resistance of the material of the vapor barrier layer may in particular be significantly higher, for example greater by a factor of ≥5, for example by a factor of ≥10 or even by a factor of ≥50 or ≥90, or possibly even by a factor of ≥1000, than the water vapor diffusion resistance of the plastic from which the housing main body or the housing cover is formed. For example, the material of the vapor barrier layer may have a water vapor diffusion resistance value of ≥10 000, in particular of ≥100 000, for example of ≥500 000 or of ≥900 000 or even of about 1 000 000.

The fact that the main housing body is formed substantially from plastic and not from metal, as in the case of conventional hard shell cell housings, means that the weight of the housing and the costs of its material and production can be advantageously reduced significantly. A reduced weight in turn allows the specific gravimetric energy at the cell level to be advantageously improved significantly, which is of particular interest in particular for use in mobile applications.

Since the amount of material for forming the housing cover is less than the amount of material for forming the housing main body, the material weight of the housing cover has less of an effect on the total weight of the hard shell cell housing than the material weight of the housing main body. It is therefore possible in principle to form the housing cover from metal.

However, within the scope of one embodiment, both the housing main body and the housing cover are formed at least substantially from plastic, wherein the housing main body and the housing cover comprise at least one vapor barrier layer.

The fact that the housing main body and, for example, also the housing cover are formed at least substantially from plastic and not from metal, like conventional hard shell cell housings, means that the weight of the housing and the costs of its material and production can be advantageously reduced further, and consequently the specific gravimetric energy at the cell level can be improved further.

Moreover, plastic has electrically insulating properties and, by contrast with metals, is not electrically conducting.

This offers the advantage of simplifying the electrical insulation and avoiding insulating problems that otherwise occur in the high-voltage area.

The fact that the housing main body can be closed off by the housing cover means that cells accommodated therein are also advantageously not open, are electrically insulated with respect to the outside and can be protected well from the effects of external mechanical forces by the hard shell cell housing. Moreover, since the housing is formed substantially from plastic, the risk of metallic fragments of the housing getting into the cells, for example in the event of an accident, which could possibly lead to an internal short-circuit, can be reduced. In this way, safety can be increased in particular. This is of advantage in particular for use in mobile applications, for example in a vehicle.

Moreover, the forming of the housing from plastic as opposed to forming of the housing from metal offers the advantage of free shaping of the housing. In this way, for example, better adaptation of the housing to the form of the roll can take place. For example, in the interior space of the housing there may be rounding, which for example makes the cell component pack, in particular roll pack, approximate to an ideally prismatic form. Furthermore, better mechanical securement of the cell components in the housing can be achieved in this way and there is no need for retainers for keeping the cells in position. In addition, an optimized design of the housing makes it possible for empty space and unconfined liquid electrolyte in the interior of the cell to be eliminated, thermal transitions to be improved, a more uniform temperature distribution to be achieved and the lifetime of the galvanic element to be prolonged. Furthermore, forming the housing from plastic makes it possible to reduce vibrations, which in turn has advantageous effects on the lifetime of electrical contacts, for example between terminals and/or collectors and cell-connecting outgoing conductor elements.

It has been found that the (water) vapor permeability of plastics depends on the chemical and physical nature of the plastic and that it is not readily possible with plastics that are usually used for constructing the housings and are inexpensive to achieve a vapor impermeability that meets the standards for alkali metal cells, and in particular for lithium-ion cells. Pleasingly, however, it has likewise been found that this can be counteracted by the use of a vapor barrier layer, since the vapor barrier layer can be used to prevent penetration of moisture by permeation of water vapor through an otherwise vapor-permeable plastic, and thus a moisture or vapor impermeability that is also suitable for alkali metal cells, and in particular lithium-ion cells, can be achieved. Surprisingly, vapor barrier layers may even be as much of a barrier to water molecules as conventionally used rolled aluminum foil. In this way, protection from environmental influences, such as salt spray, condensed water, can be advantageously ensured by the hard shell cell housing. Moreover, a vapor barrier layer can also be used to prevent any possible diffusing out of electrolyte solvent molecules.

It is therefore advantageously possible by the combination of plastic and a vapor barrier layer to provide a hard shell cell housing of low weight that can be similarly or even equally mechanically stable and vapor-blocking as conventional metallic hard shell cell housings, and consequently is suitable in particular for galvanic elements with moisture-sensitive components, such as alkali metal cells, for example lithium cells, and makes it possible to replace existing metallic housings for galvanic elements.

A lithium cell may be understood in particular as meaning an alkali metal cell which comprises lithium as the electrochemically active material, for example anode material. In this case, a lithium cell may be understood as meaning both an alkali metal cell with a metallic lithium anode, such as a lithium oxygen cell, and an alkali metal cell with a lithium-intercalating anode, such as a lithium-ion cell.

The housing main body or housing cover formed at least substantially from plastic may be understood in particular as meaning that the material volume of the housing main body or housing cover that is taken up by plastic is in particular at least more than 75 percent of the total material volume of the housing main body or housing cover. For example, the material volume of the housing main body or housing cover that is taken up by plastic may in this case be ≥90 percent of the total material volume of the housing main body or housing cover. In particular, in this case at least the supporting portions of the housing main body or housing cover may be formed from plastic. In addition, a housing main body or housing cover formed at least substantially from plastic may have portions of other materials. For example, the housing main body or housing cover may have portions which comprise a non-plastic-based moisture barrier layer and/or metallic elements, such as electrical interfaces, known as external terminals, and/or hydraulic interfaces and/or interface bushings. With respect to the total material volume of the housing main body or housing cover, the portions of the housing main body or housing cover that are formed from materials other than plastic may for example take up altogether a material volume of <75%, for example of <10%.

It is possible that the housing main body or the housing cover is produced exclusively or virtually exclusively from plastic. In the case of use of a plastic-based vapor barrier layer, the housing main body or the housing cover may for example be formed exclusively from plastic. Since only little material is required to achieve a vapor-blocking effect, it is still possible in the case where a metallic vapor barrier layer is used, for example, for the housing main body or the housing cover to be referred to for example as being formed virtually exclusively from plastic, even if the housing main body or the housing cover comprises a small amount of metal or semimetal.

Within the scope of a further embodiment, the alkali metal cell is a lithium-ion cell.

Lithium-ion cells represent a special form of lithium cells and do not have a metallic lithium anode, but an anode of what is known as an intercalation material, for example graphite, in which lithium ions can be reversibly inserted (intercalated) and extracted again (deintercalated). Lithium-ion cells also differ from lithium cells with a metallic lithium anode in that lithium-ion cells contain a generally extremely moisture-sensitive conductive salt, for example lithium hexafluorophosphate ($LiPF_6$), which under some circumstances can hydrolyze in the presence of water to form hydrogen fluoride (HF). The vapor barrier layer advantageously makes it possible to prevent penetration of moisture, in particular in the form of water vapor, through the plastic into the interior of the housing, and consequently a hydrolysis of the conductive salt of the lithium-ion cell into hydrogen fluoride.

Within the scope of a further embodiment, the interior space of the housing main body is designed for accommodating an individual cell roll, in particular a lithium-ion cell roll.

A cell roll ("jelly roll") may be understood in particular as meaning a special, that is roll-shaped, arrangement of the cell components of an alkali metal cell. A cell roll may for example be a roll-shaped component which comprises along with the electrochemically active components of an alkali metal cell electrical outgoing conductor elements, such as outgoing conductor foils, and also electrical insulating elements, such as one or more insulating films and/or one or more separator films.

Within the scope of a further embodiment, the vapor barrier layer is applied directly to the material of the housing main body (or of the housing main body and of the housing cover). In this way it is advantageously possible to dispense with additional layers such as bonding or adhesive layers, and to reduce further the weight, costs and space requirement.

Within the scope of a further embodiment, the vapor barrier layer is a metallic, organic, polymeric or vitreous layer. With such layers, a vapor-blocking effect can be advantageously achieved.

The vapor barrier layer may, for example, have a layer thickness of ≥1 μm to ≤20 μm.

Within the scope of a further embodiment, the vapor barrier layer is applied by vapor depositing, by sputtering, by galvanic coating, by spraying, by immersing and/or by roll-bonded cladding, in particular by vapor depositing, by sputtering, by galvanic coating and/or by roll-bonded cladding. These application techniques have proven to be advantageous for applying the vapor barrier layer. In this case, the vapor barrier layer can be applied to the housing main body and the housing cover in one method step. Before the application of the vapor barrier layer, the underlying surface, in particular the plastic of the housing main body or of the housing cover, may possibly be subjected to a plasma and/or corona treatment. In this way, the bonding of the vapor barrier layer to the underlying surface can be advantageously improved.

Within the scope of a further embodiment, the vapor barrier layer is a metallic layer. In particular, the vapor barrier layer may comprise aluminum and/or chromium and/or silicon and/or iron. In particular, the vapor barrier layer may be formed from aluminum and/or chromium and/or silicon and/or high-grade steel. A metallic vapor barrier layer may be applied for example by vapor depositing, by sputtering or by galvanic coating.

The metallic vapor barrier layer may possibly be a superhydrophobic, nanostructured layer. The superhydrophobic properties may in this case be achieved in particular by a structuring, in particular in the nanometer range, by analogy with what is known as the Lotus effect. For example, the metallic vapor barrier layer may comprise at least one nanostructured semimetal, in particular nanostructured silicon. In particular, the vapor barrier layer may be formed from at least one nanostructured semimetal, for example nanostructured silicon.

If the vapor barrier layer is a metallic layer, it is possible to apply an insulating layer of an electrically insulating material to at least part of the vapor barrier layer, for example the part that is adjacent the interior space. However, an electrical insulation can also be achieved by other measures, for example by the packaging of cell components in plastic packaging films that is explained later.

However, the vapor barrier layer may similarly be an organic layer. In particular, the vapor barrier layer may comprise parylene or be formed therefrom.

In particular, the vapor barrier layer may be a polymeric layer. For example, the vapor barrier layer may comprise parylene and/or at least one nanostructured polyolefin or be formed therefrom.

An organic or polymeric vapor barrier layer may, for example, be applied by spraying or immersing, in particular spraying.

In particular, the organic or polymeric vapor barrier layer may be a superhydrophobic, nanostructured layer. The superhydrophobic properties may in this case be achieved in particular by a structuring, in particular in the nanometer range, by analogy with what is known as the Lotus effect. For example, the vapor barrier layer may comprise at least one nanostructured polyolefin, in particular nanostructured polypropylene (PP) and/or polyethylene (PE). In particular, the vapor barrier layer may be formed from at least one nanostructured polyolefin, for example nanostructured polypropylene (PP) and/or polyethylene (PE).

However, the vapor barrier layer may similarly be a vitreous layer. For example, the vapor barrier layer may comprise silica.

In particular, the vapor barrier layer may be formed from at least one nanostructured polyolefin, for example nanostructured polypropylene (PP) and/or polyethylene (PE), and/or at least one nanostructured semimetal, for example nanostructured silicon.

These superhydrophobic materials have the advantage that—even when they are in direct contact with electrochemically active cell components, such as the organic carbonates and/or lithium conductive salt—they can have great chemical and electrochemical long-term stability. It has advantageously been possible to obtain particularly good results with nanostructured polypropylene (PP).

Within the scope of a further embodiment, at least the surfaces of the housing main body or of the housing main body and of the housing cover that are lying on the outside in the closed state of the housing are covered, in particular substantially completely, with a vapor barrier layer.

Within the scope of a further embodiment, at least the surfaces of the housing main body or of the housing main body and of the housing cover that are lying on the inside in the closed state of the housing are covered, in particular substantially completely, with a vapor barrier layer. In addition to the advantages already explained, in particular in the case of an embodiment of the hard shell cell housing that is explained later and in which the interior space in the housing main body is divided into compartments by separating walls, the application of an inner vapor barrier layer has the advantage that, in the event of a defective cell of a module, the other cells of this module can be protected better.

Within the scope of a further embodiment, the vapor barrier layer is integrated in the plastic of the housing main body or of the housing main body and of the housing cover. In particular, in this case the vapor barrier layer may be integrated in the plastic of the housing main body or of the housing cover in such a way that the vapor barrier layer surrounds the interior space of the housing substantially completely in the closed state of the housing.

Within the scope of a further embodiment, the housing main body or the housing main body and the housing cover is or are formed at least substantially from a plastic which comprises at least one polymer selected from the group consisting of polyolefins, polyphenylene sulphides and combinations thereof. For example, the housing main body and the housing cover may be formed from polypropylene (PP), polyethylene (PE), polypropylene-polyethylene copolymer (PP/PE) or polyphenylene sulfide (PPS). These plastics advantageously have sufficient temperature resistance, good chemical resistance and good mechanical stability.

The housing main body or the housing cover may, for example, have a wall thickness of >100 μm.

The housing main body or the housing main body and the housing cover may, for example, be produced by a thermoforming process or injection-molding process, in particular an injection-molding process, in particular from plastic. The use of these processes for plastics makes it possible to realize many forms, which allow batteries to be accommodated more optimally, for example in vehicles.

Within the scope of a further embodiment, the housing main body and the housing cover have connecting elements which are designed to form a tongue-and-groove plug-in connection when the housing is closed off. In particular, the connecting elements for forming the tongue-and-groove plug-in connection may run around the opening of the interior space in the housing main body, in particular around the full periphery or uninterruptedly. In this way, airtight closing of the hard shell cell housing and a good sealing effect can be advantageously achieved when the housing is closed off. In particular, at least one groove-shaped and/or tongue-shaped connecting element may be formed on the end faces of the walls of the housing main body that bound the opening of the interior space in the housing main body, in particular wherein the housing cover has connecting elements corresponding thereto for forming a tongue-and-groove plug-in connection.

In order to improve the sealing effect further within the scope of this embodiment, the connecting elements for forming the tongue-and-groove plug-in connection are preferably also partially or completely covered with a vapor barrier layer or provided with a vapor barrier layer integrated therein. In particular, when closing off the housing or when forming the tongue-and-groove plug-in connection, it may be provided that vapor barrier layers covering the connecting elements can be placed against one another, for example pressed against one another. In this way, entry of moisture can be advantageously prevented particularly effectively and the moisture or vapor impermeability can be increased further.

Within the scope of a further embodiment, therefore, the connecting elements for forming the tongue-and-groove plug-in connection are partially or completely covered with a vapor barrier layer or are provided with a vapor barrier layer integrated therein. If an insulating layer without vapor-blocking properties is provided, the vapor barrier layer is preferably not covered with the insulating layer in the region of the connecting elements for forming the tongue-and-groove plug-in connection.

Furthermore, the hard shell cell housing may have a temperature-control device. The temperature-control device may for example take the form of a plate, for example the form of a cooling plate. In order to supply the temperature-control device with a temperature-control medium, in particular cooling medium, the hard shell cell housing may also have at least two, in particular externally accessible, hydraulic interfaces.

Furthermore, the hard shell cell housing may have at least two, in particular externally accessible, electrical interfaces (terminals), by way of which alkali metal cells in the interior of the housing can be electrically contacted.

With regard to further embodiments and advantages of the hard shell cell housing according to the disclosure, reference is hereby made explicitly to the explanations in connection with the galvanic elements according to the disclosure, the method according to the disclosure and the figures.

A further subject matter of the present disclosure is a galvanic cell, which comprises a hard shell cell housing according to the disclosure. In particular, the cell components of an individual alkali metal cell may in this case be arranged in the interior space of the housing main body of the hard shell cell housing. For example, in this case an individual (lithium-ion) cell roll may be arranged in the interior space of the housing main body of the hard shell cell housing.

The alkali metal cell may in particular be a lithium cell. In particular, the alkali metal cell may be a lithium-ion cell. Within the scope of one configuration, an individual cell roll, lithium-ion cell roll, is arranged in the interior space of the housing main body.

An alkali metal cell in the form of a lithium-ion cell may in particular comprise an anode of what is known as an intercalation material, into which lithium ions can be reversibly intercalated and deintercalated. For example, the anode of a lithium-ion cell may comprise a carbon-based intercalation material, such as graphite, graphene, carbon nanotubes, hard carbons, soft carbons and/or silicon-carbon blends. As cathode material, a lithium-ion cell may for example comprise transition metal oxides with a layer structure, such as lithium-cobalt oxide ($LiCoO_2$) and/or lithium-nickel-cobalt-manganese oxide (NCM). Furthermore, a lithium-ion cell may in particular comprise at least one conductive salt, for example lithium hexafluorophosphate ($LiPF_6$) and/or lithium tetrafluoroborate ($LiBF_4$), and possibly at least one solvent, for example ethylene carbonate (EC) and/or dimethyl carbonate (DMC). Between the anode and the cathode, a lithium-ion cell may in particular comprise a separator.

For the electrical contacting of the anode and the cathode, a lithium-ion cell may in particular comprise electrical outgoing conductor foils. The anodic outgoing conductor foil may for example be formed from copper and the cathodic outgoing conductor foil may be formed from aluminum.

Within the scope of one embodiment, the cell components of the alkali-metal cell, in particular the lithium-ion cell roll, are packaged in a plastic packaging film. The cell components of the alkali metal cell packaged in this way in plastic packaging film, in particular the (lithium-ion) cell roll packaged in this way in plastic packaging film, may then be arranged in the housing main body.

The plastic packaging film allows the cell components, in particular the cell roll, to be electrically insulated, in particular without a further method step. Since the electrical insulation can be ensured by the plastic packaging films, the plastic packaging film can come into contact with other electrical components without a short-circuit occurring. In this way, in particular, an electrical insulation with respect to a neighboring metallic vapor barrier layer can be ensured.

Moreover, the plastic packaging films can allow a defined pressure to be applied to the cell components, in particular cell roll, which may be advantageous for proper functioning of the cells.

The fact that the cell components packaged in plastic packaging films are arranged in the interior space of the housing main body of the hard shell cell housing that can be closed off by the housing cover and that the cells are not installed in the conventional open module type of construction means that protection from mechanical effects can be advantageously ensured, which is advantageous in particular for use in mobile applications, such as in vehicles.

Altogether, this embodiment advantageously makes it possible to dispense with a metallic housing and to minimize further the weight and the costs of material and production.

Within the scope of a special configuration, the plastic packaging films comprise at least one polar-modified, in particular grafted, polyolefin, for example polypropylene, for example maleic acid grafted polypropylene. In particular, the plastic packaging films may be formed from at least one polar-modified, in particular grafted, polyolefin, for example polypropylene, for example maleic acid grafted polypropylene.

Polar-modified polyolefins may advantageously have extremely high bonding to metals. This advantageously allows a good sealing effect to be achieved between plastic packaging films and metallic outgoing conductor elements, for example outgoing conductor pins, known as collectors, for example of copper, aluminum or nickel.

The cell components, in particular the cell roll, may for example be welded in the plastic packaging film.

The plastic packaging film may be advantageously made thin, and have for example a film thickness of ≥20 μm to ≤100 μm.

The plastic packaging film may likewise have at least one vapor barrier layer. In particular, it may comprise the types of vapor barrier layers explained in connection with the hard shell cell housing according to the disclosure. The vapor barrier layer may be integrated in the plastic of the packaging film and/or cover the outer side and/or inner side of the packaging film. If the plastic packaging film has a metallic vapor barrier layer, it may be electrically insulated from the cell components or other electrically conducting components by one or more, for example inner, insulating layers or plastic film layers of the packaging film.

Electrical contacting of the alkali metal cell arranged in the interior space may take place in particular by way of the at least two, in particular externally accessible, electrical interfaces (terminals).

With regard to further embodiments and advantages of the galvanic elements according to the disclosure, reference is hereby made explicitly to the explanations in connection with the hard shell cell housing according to the disclosure, the method according to the disclosure and the figures.

A further subject matter of the present disclosure is a method for producing a galvanic cell according to the disclosure which comprises the following method steps:
  a) forming/providing a housing main body, with an interior space for accommodating the cell components of an individual alkali metal cell of plastic and possibly a housing cover for closing off the interior space of the housing main body of plastic,
  b) introducing the cell components of an individual alkali metal cell, in particular of a (lithium-ion) cell roll, into the interior space of the housing main body, and
  c) closing off, in particular closing off in an airtight manner, the interior space of the housing main body with the closure cover,
wherein, in method step a) and/or in a method step d), taking place after method step c), the plastic of the housing main body or the plastic of the housing main body and of the housing cover is provided or coated with at least one vapor barrier layer, for example by an application technique explained within the scope of the method according to the disclosure, and/or wherein, in method step a), at least one vapor barrier layer is integrated into the plastic of the housing main body or into the plastic of the housing main body and of the housing cover.

Between method steps c) and d), the method may also have the method step c1) of connecting the housing cover with a material bond, in particular by welding, for example plasma welding, to the housing main body. In particular, in this case a continuous, in particular uninterrupted and/or peripheral, material-bonding connecting region may be created, for example in the form of a peripheral weld seam. In this way, the vapor impermeability can be advantageously improved further. In a subsequent method step d), the material-bonding connecting region may advantageously be likewise coated with the at least one vapor barrier layer.

In order to improve the bonding of a vapor barrier layer on the plastic of the housing main body and of the housing cover, it may be advantageous to subject the plastic surface of the housing main body and of the housing cover to a plasma and/or corona treatment before the application of the vapor barrier layer.

Within the scope of one configuration, in method step b) an alkali metal cell, the cell components of which, in particular cell roll, are packaged in a plastic packaging film, is introduced into the interior space of the housing main body.

Within the scope of one configuration of this, the packaging of the cell components, in particular of the cell roll, is performed by the cell components of an alkali metal cell, in particular a cell roll, being enclosed by a plastic packaging film and the openings thereof subsequently being closed off, for example by welding. In particular, the cell components of an alkali metal cell, in particular a cell roll, may be introduced into a pouch-shaped plastic packaging film, the opening of which is subsequently closed off, for example by welding.

For the electrical contacting of the cell components of an alkali metal cell, the alkali metal cell may in particular comprise electrical outgoing conductor elements. These may for example take the form of outgoing conductor foils, outgoing conductor pins (collectors), outgoing conductor cables and outgoing conductor plates.

In the case of a cell roll, it may be for example that electrical outgoing conductor foils that are integrated in the winding are electrically contacted by two electrical outgoing conductor pins (collectors) being inserted into the cell roll at positions at which they respectively electrically contact one of the outgoing conductor foils (cathodic or anodic outgoing conductor foil). The outgoing conductor pins (collectors) may in particular be respectively formed from the same material as the outgoing conductor foil to be contacted therewith. For example, a cathodic outgoing conductor foil of aluminum may be electrically contacted with an outgoing conductor pin (collectors) of aluminum and an anodic outgoing conductor foil of copper may be electrically contacted with an outgoing conductor pin (collectors) of copper. The direction of insertion of the outgoing conductor pins (collectors) may in this case be for example parallel to the axis of the winding.

The insertion of the outgoing conductor pins (collectors) may in principle take place both before and after the packaging of the cell components of an alkali metal cell, in particular of a cell roll, in a plastic packaging film.

A further subject matter of the present disclosure is a galvanic cell produced by a method according to the disclosure.

A further subject matter of the present disclosure is a mobile or stationary system, for example a vehicle, which comprises at least one galvanic cell according to the disclosure.

With regard to further embodiments and advantages of the method according to the disclosure, the galvanic element thereby produced and the mobile or stationary system according to the disclosure, reference is hereby made explicitly to the explanations in connection with the hard shell cell housing according to the disclosure, the galvanic cell according to the disclosure, the method according to the disclosure and the figures.

BRIEF DESCRIPTION OF THE DRAWINGS

Further advantages and advantageous configurations of the subjects according to the disclosure are illustrated by the drawings and are explained in the description that follows. It should be noted that the drawings are only of a descriptive character and are not intended to restrict the disclosure in any form. In the drawings.

DETAILED DESCRIPTION

Figure 1:
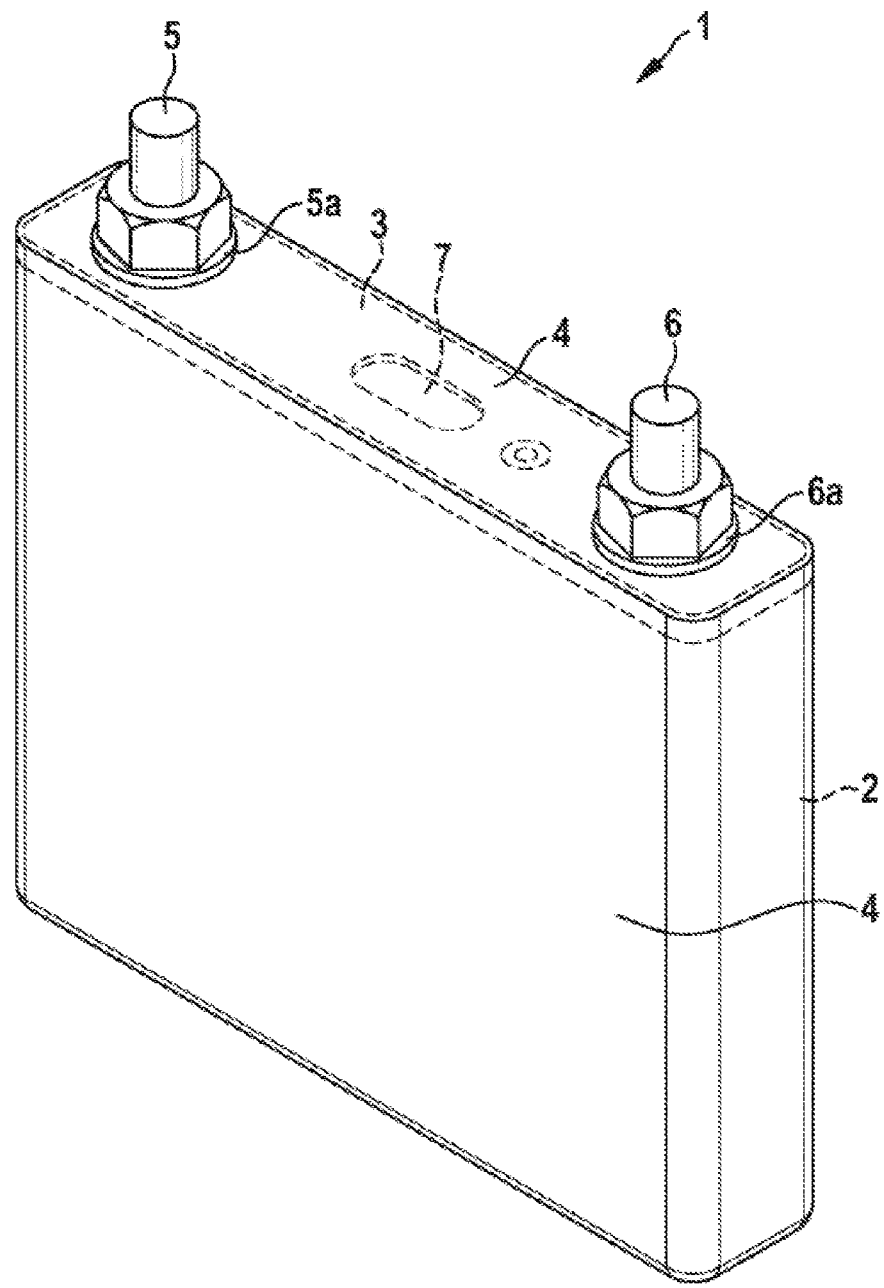
FIG. 1 shows a schematic perspective view of an embodiment of the hard shell cell housing and galvanic element according to the disclosure for or with an individual galvanic cell.

FIG. 1 shows a galvanic element 1 with a hard shell cell housing, by which the cell components of an individual galvanic cell are protected from environmental influences. The galvanic cell may in particular be a lithium-ion cell. The cell components of the galvanic cell may in this case be formed in particular as a cell roll.

FIG. 1 illustrates that the hard shell cell housing has a housing main body 2 with an interior space (not represented) for accommodating the cell components of the galvanic cell and a housing cover 3 for closing off the interior space of the housing main body 2. In this case, the housing main body 2 and the housing cover 3 are formed substantially from plastic. The surfaces of the housing main body 2 and of the housing cover 3 that are on the outside in the closed state shown of the housing are in this case covered substantially completely with a vapor barrier layer 4, which has been applied to the plastic of the housing main body 2 and of the housing cover 3 by an application technique after the introduction of the cell components into the interior space of the housing main body 2 and after the closing off of the interior space of the housing main body 2 with the housing cover 3. Substantially complete covering of the surfaces of the housing main body 2 and of the housing cover 3 that are on the outside in the closed state with a coating can be understood in this case as meaning that portions of the surface of the housing main body 2 and of the housing cover 3 that are already covered by other components, for example washers 5*a*, 6*a* for the mechanical fastening of the electrical interfaces (terminals) 5, 6, may remain uncoated during the application. This is so because penetration of moisture can be ensured even in this case, since on the one hand the covering components may have a vapor-blocking effect and on the other hand the covering components, even without themselves having a vapor-blocking effect, may likewise be provided with the vapor barrier layer 4, and consequently with a vapor-blocking effect, by the subsequent spraying. Since the join between the housing main body 2 and the housing cover 3 and also a safety valve 7 lie under the vapor barrier layer 4, these are indicated by dashed lines.

FIGS. 2*a* to 6 illustrate an embodiment of the method according to the disclosure that is designed for producing the hard shell cell housing or galvanic element shown in FIG. 1.

Figure 2A:
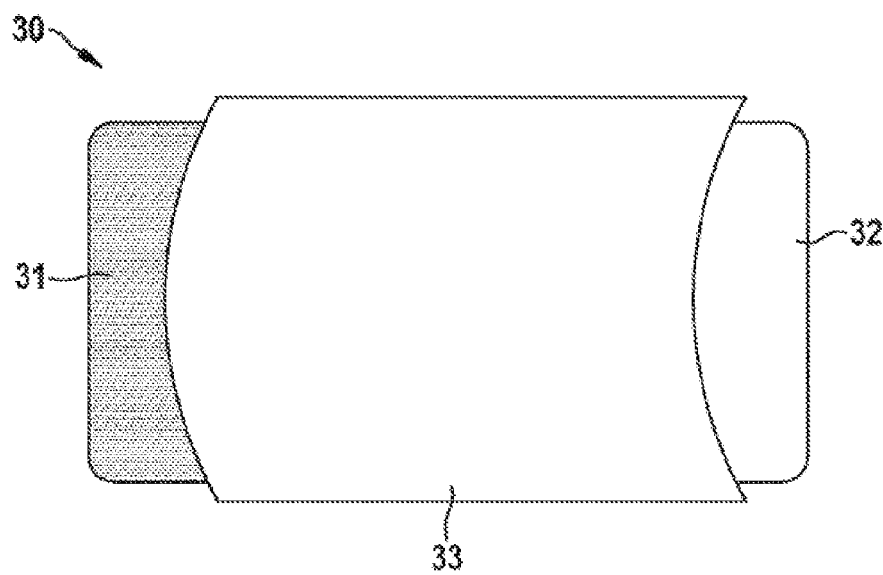
FIGS. 2*a*-5 show schematic views to illustrate an embodiment of the method according to the disclosure which is designed for producing the hard shell cell housing or galvanic element shown in FIG. 1.

FIG. 2*a* shows that a cell roll 30, for example a lithium-ion cell roll, is provided, having a winding axis perpendicular to the lower edge of the page and wound in such a way that both the anodic outgoing conductor foil 31 of copper and the cathodic outgoing conductor foil 32 are externally accessible. The cell roll 30 is held together by a film 33 of an electrically insulating material.

Figure 2B:
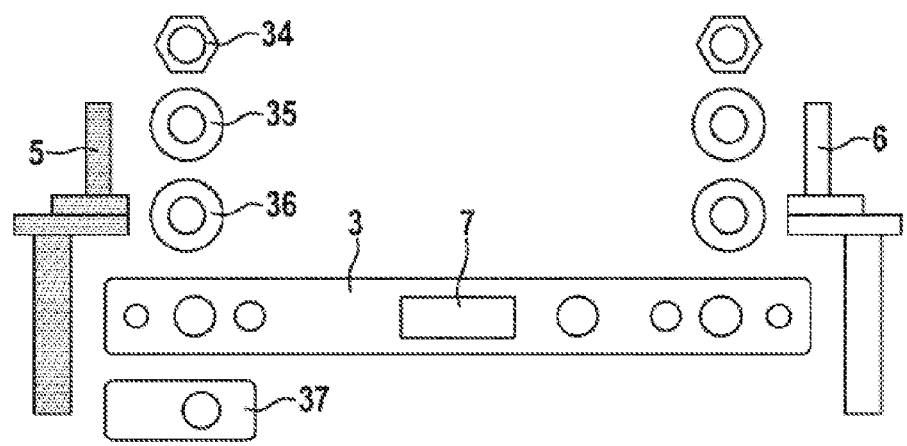
Figure 2C:
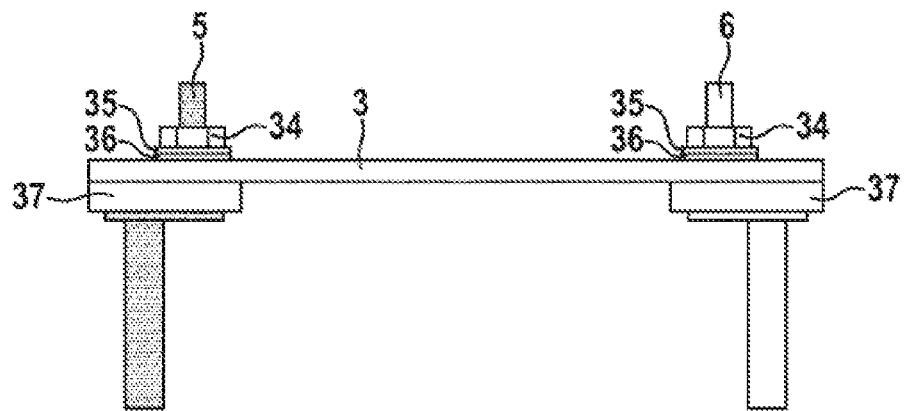

FIGS. 2*b* and 2*c* show a possible way of forming and arranging outgoing conducting elements for the electrical contacting of the anodic outgoing conductor foil 31 and cathodic outgoing conductor foil 32 of the cell roll 30 shown in FIG. 2*a*. In this case, FIG. 2*b* shows the outgoing conductor elements in the individually separated state and FIG. 2*c* shows the outgoing conductor elements in the assembled state. The outgoing conductor elements 5, 6 are formed on the one hand as electrical interfaces (terminals) for the electrical contacting outside the housing and on the other hand as outgoing conductor pins (collectors) for the electrical contacting of the outgoing conductor foils 31, 32 inside the housing. In this case, the outgoing conductor elements 5, 6 are respectively formed from the same material as the outgoing conductor foil 31, 32 to be contacted therewith. FIGS. 2*b* and 2*c* illustrate that the outgoing conductor elements 5, 6 can be respectively led through an opening in a housing cover 3. In the case where the housing cover is formed from metal, for example aluminum, the insulating elements 36, 37 are provided in order to insulate the outgoing conductor elements 5, 6 electrically from the housing cover. In the case of a housing cover formed from plastic, it is advantageously possible to dispense with the insulating elements 36, 37, which reduces further the weight and the costs of material and assembly. FIGS. 2*b* and 2*c* also illustrate that the outgoing conductor elements 5, 6 are mechanically connected to the housing cover 3 by fastening elements 34, 35. Within the scope of the embodiment shown, the mechanical fastening takes place by a screw connection, the outgoing conductor elements 5, 6 being provided with an external thread and interacting with nuts corresponding thereto and also possibly washers 35.

Figure 3:
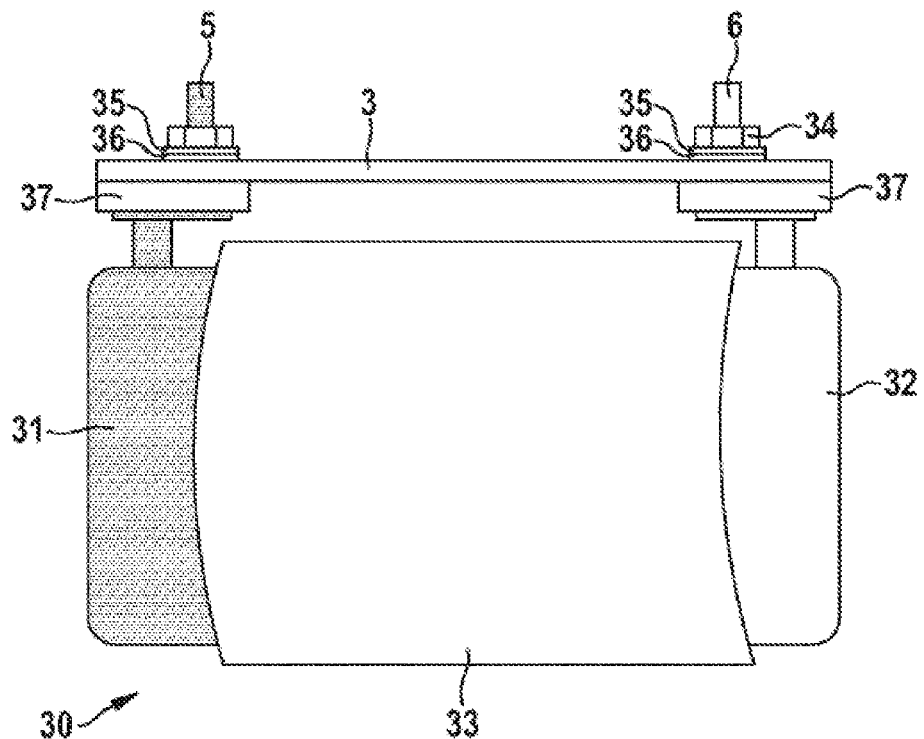

FIG. 3 shows that, in the state in which they are installed with the cover 3, the outgoing conductor elements shown in FIGS. 2*b* and 2*c* can be inserted into the cell roll 30 shown in FIG. 2*a* in such a way that one outgoing conductor element 5 electrically contacts the anodic outgoing conductor foil and the other outgoing conductor element 6 electrically contacts the cathodic outgoing conductor foil.

Figure 4:
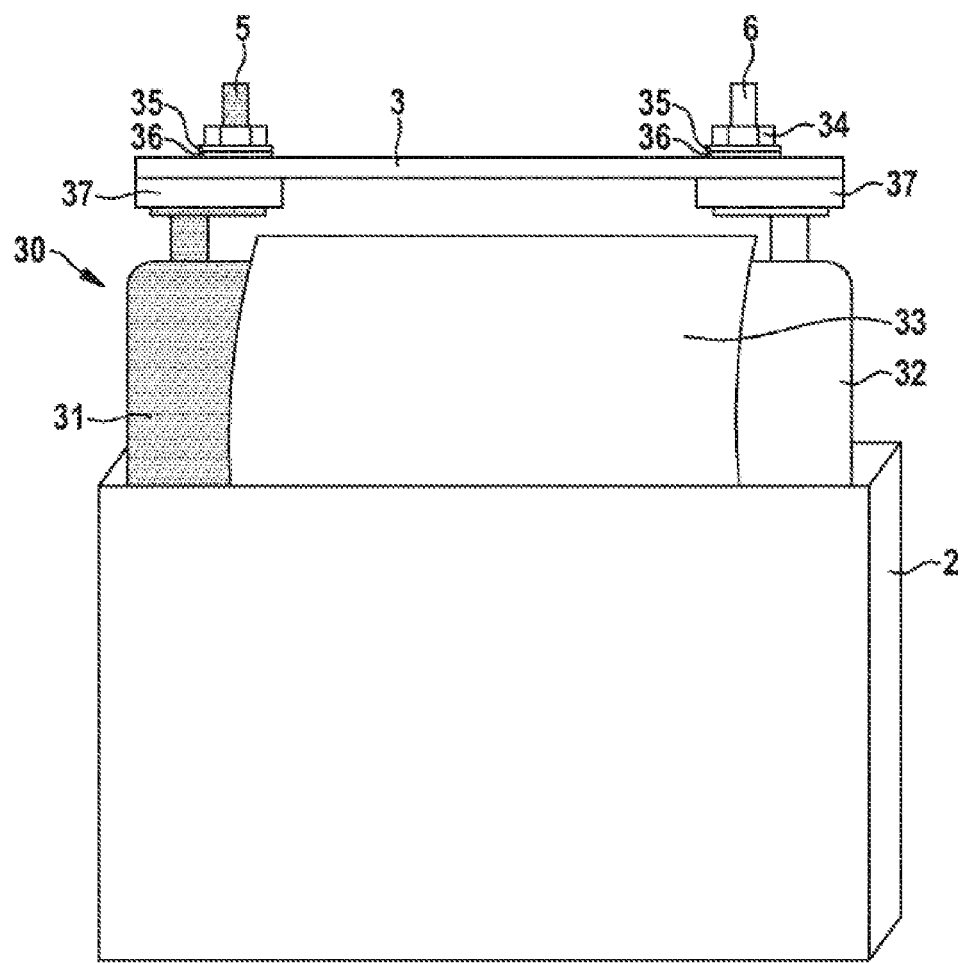

FIG. 4 illustrates that the arrangement shown in FIG. 3 is introduced into the interior space of a housing main body 2 in such a way that the housing cover 3 closes off the interior space of the housing main body 2 after the cell roll 30 has been introduced completely.

Figure 5:
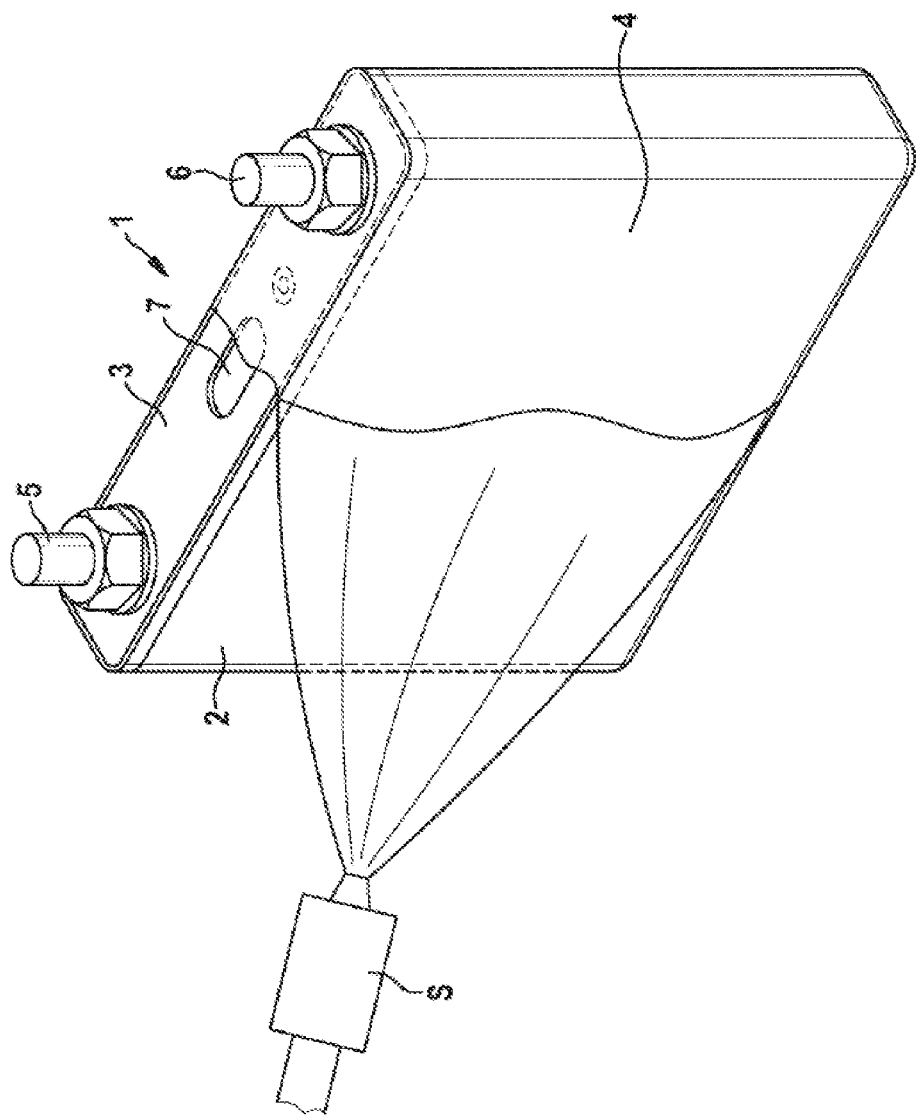

FIG. 5 illustrates that, after the hard shell cell housing has been closed off, the outer surfaces of the housing main body 2 and of the housing cover 3 and also the join and possibly components neighboring the join, such as the washers 35, are provided with a vapor barrier layer 4 by an application technique, which for illustrative reasons is represented here as a spraying technique.

Figure 6:
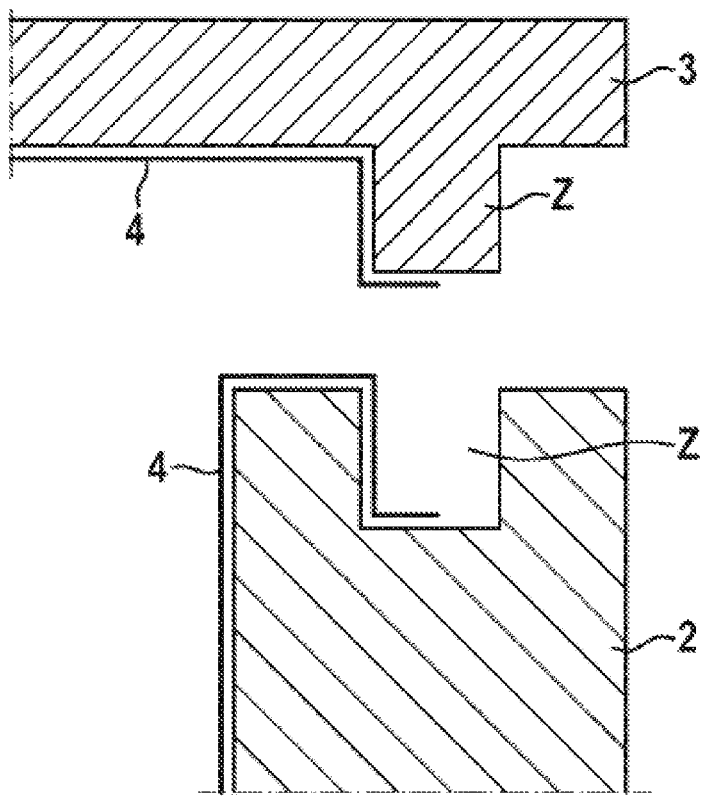
FIG. 6 shows a schematic cross section through an embodiment of the hard shell cell housing according to the disclosure in which the housing main body and the housing cover are provided with connecting elements for forming a tongue-and-groove plug-in connection for closing off the housing in an airtight manner.

In the case of a rebated configuration of the housing main body 2 and of the housing cover 3, shown for example in FIG. 6, the interior space of the housing main body 2 may already be closed off in an airtight manner by joining together the two housing components. However, it is similarly possible to weld the housing main body 2 and the housing cover 3 to one another, for example by plasma welding, or to adhesively bond them.

FIG. 6 comprises a further embodiment of a hard shell cell housing in which the housing main body 2 and the housing cover 3 are provided with connecting elements Z for forming a tongue-and-groove plug-in connection for closing off the housing in an airtight manner. In this case, the connecting elements Z preferably run around the opening of the interior space in the housing main body 2.

The connecting elements Z are in this case likewise at least partially covered with the vapor barrier layer 4 in such a way that, when forming the plug-in connection, the vapor barrier layers 4 of the connecting elements Z of the housing main body 2 and of the housing cover 3 lie against one another. In this way, a particularly good sealing effect can be advantageously achieved.

The invention claimed is:

1. A hard shell cell housing for an individual alkali metal cell, comprising:
   a housing main body that is formed at least substantially from plastic, and that includes:
     an interior space configured to accommodate cell components of an individual alkali metal cell;
     an opening into the interior space; and
     at least one first connecting element that extends around the opening, and that includes a first vapor barrier layer; and
   a housing cover that, in a closed state, is configured to close off the interior space of the housing main body, each first connecting element of the housing main body configured to engage with a respective second connecting element of the housing cover to form a tongue-and-groove plug-in connection between the housing main body and the housing cover in the closed state of the housing cover:
     the respective second connecting element including a second vapor barrier layer; and
     each first connecting element and the respective second connecting element arranged such that the first vapor barrier layer and the second vapor barrier layer press against each other in the closed state of the housing cover.

2. The hard shell cell housing as claimed in claim 1, wherein the individual alkali metal cell is a lithium-ion cell.

3. The hard shell cell housing as claimed in claim 1, wherein the interior space of the housing main body is configured to accommodate an individual cell roll.

4. The hard shell cell housing as claimed in claim 1, wherein the housing cover is formed at least substantially from plastic.

5. The hard shell cell housing as claimed in claim 1, wherein (i) the housing main body or (ii) the housing main body and the housing cover are formed at least substantially from a plastic which comprises at least one polymer selected from the group consisting of polyolefins, polyphenylene sulfides, and combinations thereof.

6. The hard shell cell housing as claimed in claim 1, further comprising:
   at least one vapor barrier layer that covers portions of inner and outer surfaces of either (i) the housing main body or (ii) the housing main body and of the housing cover.

7. The hard shell cell housing as claimed in claim 1, wherein the first vapor barrier layer and second vapor barrier layer is formed by vapor depositing, by sputtering, by galvanic coating, by spraying, or by immersing.

8. The hard shell cell housing as claimed in claim 1, wherein the first vapor barrier layer and the second vapor barrier layer each include at least one of aluminum, chromium, and silicon.

9. A hard shell cell housing for an individual alkali metal cell, comprising:
   a housing main body that includes:
     an interior space configured to accommodate cell components of an individual alkali metal cell; and
     at least one vapor barrier layer; and
   a housing cover configured to close off the interior space of the housing main body;
   wherein the housing main body is formed at least substantially from plastic; and
   wherein the at least one vapor barrier layer is integrated into (i) the plastic of the housing main body, or (ii) the plastic of the housing main body and a plastic of the housing cover, such that the at least one vapor barrier layer substantially completely surrounds the interior space of the housing main body in a closed state, and such that at least a portion of material forming the vapor barrier layer is intermingled with (i) the plastic of the housing main body, or (ii) the plastic of the housing main body and a plastic of the housing cover.

10. A hard shell cell housing for an individual alkali metal cell, comprising:
    a housing main body that is formed at least substantially from plastic, and that includes:
      an interior space configured to accommodate cell components of an individual alkali metal cell;
      an opening into the interior space; and
      at least one first connecting element that extends around the opening, and that includes a first vapor barrier layer;
    a housing cover that, in a closed state, is configured to close off the interior space of the housing main body, each first connecting element of the housing main body configured to engage with a respective second connecting element of the housing cover to form a tongue-and-groove plug-in connection between the housing main body and the housing cover in the closed state of the housing cover:
      the respective second connecting element including a second vapor barrier layer; and
      each first connecting element and the respective second connecting element arranged such that the first vapor barrier layer and the second vapor barrier layer press against each other in the closed state of the housing cover; and
    at least one vapor barrier layer that at least one of:
      covers portions of inner and outer surfaces of either (i) the housing main body or (ii) the housing main body and of the housing cover; and
      is integrated into portions of either (i) the housing main body or (ii) the housing main body and of the housing cover.

11. The hard shell cell housing as claimed in claim 1, wherein the vapor barrier layer is a superhydrophobic, nanostructured layer.

12. The hard shell cell housing as claimed in claim 6, wherein the at least one vapor barrier layer is disposed directly on material of (i) the housing main body or of (ii) the housing main body and the housing cover.

13. The hard shell cell housing as claimed in claim 6, wherein the at least one vapor barrier layer covers an entirety of the inner and outer surfaces.

14. The hard shell cell housing as claimed in claim 1, further comprising:
   at least one vapor barrier layer that is integrated into portions of either (i) the housing main body or (ii) the housing main body and of the housing cover.

15. The hard shell cell housing as claimed in claim 14, wherein the at least one vapor barrier layer is integrated into an entirety of (i) the housing main body or (ii) the housing main body and of the housing cover.

\* \* \* \* \*